United States Patent [19]

Kuwa et al.

[11] Patent Number: 5,537,389

[45] Date of Patent: Jul. 16, 1996

[54] DISK CARTRIDGE HAVING A SINGLE CLOSING ENERGIZER FOR CLOSING TWO INDEPENDENTLY OPENED SHUTTERS

[75] Inventors: Tadahiro Kuwa; Makoto Miura; Tamotsu Iida; Yoshitane Tsuburaya; Yoshitake Kato, all of Ibaraki; Masanori Uematsu, Kyoto; Masayuki Yukawa, Kyoto; Junji Takamoto, Kyoto; Masahiko Ota, Kyoto, all of Japan

[73] Assignees: Hitachi Maxwell, Ltd., Osaka; Nintendo Co., Ltd., Kyoto, both of Japan

[21] Appl. No.: 154,408

[22] Filed: Nov. 19, 1993

[30] Foreign Application Priority Data

| | | | |
|---|---|---|---|
| Nov. 30, 1992 | [JP] | Japan | 4-320239 |
| Nov. 30, 1992 | [JP] | Japan | 4-320244 |
| Jan. 27, 1993 | [JP] | Japan | 5-011718 |
| Mar. 5, 1993 | [JP] | Japan | 5-045354 |

[51] Int. Cl.$^6$ ............................................. G11B 23/03
[52] U.S. Cl. ........................................ 369/291; 360/133
[58] Field of Search ......................... 369/291; 360/133, 360/135

[56] References Cited

U.S. PATENT DOCUMENTS

| | | | |
|---|---|---|---|
| 4,780,784 | 10/1988 | Covington et al. | 360/133 |
| 4,814,924 | 3/1989 | Ozeki | 360/133 |
| 5,140,489 | 8/1992 | Barnard | 369/291 |
| 5,278,717 | 1/1994 | Sasaki et al. | 360/133 |

FOREIGN PATENT DOCUMENTS

| | | | |
|---|---|---|---|
| 57-212669 | 12/1982 | Japan | 360/133 |
| 61-983 | 1/1986 | Japan | 369/291 |
| 61-250882 | 11/1986 | Japan | 360/133 |
| 64-67781 | 3/1989 | Japan . | |
| 3-122880 | 5/1991 | Japan . | |
| 3-48780 | 10/1991 | Japan . | |
| 4-16309 | 4/1992 | Japan . | |

*Primary Examiner*—Stuart S. Levy
*Assistant Examiner*—Kevin M. Watkins
*Attorney, Agent, or Firm*—Nixon & Vanderhye

[57] ABSTRACT

Scratches on the recording disk caused by sliding of a disk cartridge shutter is prevented by slidably inserting first and second shutters between a tray and a case on the opposite side to a recording disk accommodating portion of the tray. The first shutter simultaneously opens and closes a case side driving shaft insert hole, a case side head insert hole, a tray side driving shaft insert hole, and a tray side head insert hole. The second shutter opens and closes a terminal hole. The second shutter is opened independently of the first shutter and is held in a position so that the case side driving shaft insert hole, the case side head insert hole, the tray side driving shaft insert hole, and the tray side head insert hole are not closed. Closing the first shutter, however, causes the second shutter to also close.

5 Claims, 14 Drawing Sheets

DISK CARTRIDGE HAVING A SINGLE CLOSING ENERGIZER FOR CLOSING TWO INDEPENDENTLY OPENED SHUTTERS

BACKGROUND OF THE INVENTION

1. Field of the Invention

The present invention relates to disk cartridges, and particularly to a disk cartridge which is installed in a disk reproducing apparatus with a disk-like recording medium accommodated therein.

The following disclose disk cartridges which can be installed in a disk apparatus with the disk-like recording medium accommodated therein, Japanese Utility Model Publication No. 3-48780 (reference 1), Japanese Patent Laying-Open No. 3-122880 (reference 2), Japanese Utility Model Publication No. 4-16309 (reference 3), and Japanese Patent Laying-Open No. 64-67781 (reference 4). The reference numerals enclosed in parentheses in the description below are used in the references cited above.

In reference 1, the lid (1) is attached to the magazine frame (2) rotatably and openably, the disk (21) is accommodated in the disk install hole (25) of the magazine frame (2), and the shutter (3) is provided pivotably being abutting on one surface of the disk (21). In reference 2, the shutter with its sectional shape being U-shaped is slidably provided out of the case so that the shutter and the disk are not directly in contact with each other. In reference 3, the circuit board (4) having electronic parts packaged therein is incorporated in the concave portion (20) surrounded with the upper and lower shells (2a, 2b). The ROM (5) having previously written information and the connector (6a) connected to the pin terminal of the ROM through the print interconnection are provided on the circuit board (4). Programs for protecting data recorded in the information recording medium such as the magnetic disk is recorded in the ROM (5). The contact point (7) of the connector (6a) is exposed from the edge surface of the cassette (2) to make connection to the disk drive apparatus. The single shutter (3), having a large U-like sectional shape, is slidably provided on the exterior of the cassette (2) to prevent inferior contact due to foreign matter or dust present on the contact point (7). In order to protect the contact point (7), this shutter (3) covers the head insert hole (16) and the contact point (7) of the connector (6a) when the cassette (2) is not used, and exposes the head insert hole (16) and the connector (6a) when it is used. In reference 4, the outer terminal such as a connector is provided in a different position, where the outer terminal (36) is provided between the head insert window (33) and the side edge of the disk cartridge.

In reference 1, since the shutter (3) is provided just under the disk (21), the shutter (3) may come in contact with the recording surface of the disk (21) to hurt the recording surface when the shutter (3) is opened or closed or when carrying the disk cartridge, possibly resulting in errors in recording and reproducing.

While reference 2 does not have the problem of reference 1, it has a different problem. Because the shutter is exposed, the edge thereof may injure a user's hands, especially if it is made of metal. Moreover, a user can easily open the shutter so that he/she may touch the recording surface of the disk from the head insert hole which may cause errors. Furthermore, the U-shaped shutter may slightly open to form a gap between the shutter and the case where dust may enter to attach on the recording surface of the disk also possibly resulting in errors.

In reference 3, since the contact point (7) of the connector (6a) is provided alongside of the head insert hole (16) along the sliding direction of the shutter (3), and the single shutter (3) opens and closes both the head insert hole and the connector (6a) simultaneously, its lateral width is large. Further, an area corresponding to the lateral width of the connector (6a) must be provided on both sides of the window hole (13) of the shutter (3) so that the lateral width of the shutter (3) increases as the lateral width of the connector (6a) increases. Similarly, the interval between the head insert hole (16) of the cassette (2) and the connector (6a) must increase corresponding to the lateral width of the connector (6a) with the result that the lateral width of the cassette (2) must be increased. Because the electronic circuit part must be provided in the vicinity of the head insert hole and the connecting member in the disk drive apparatus must also be provided in the vicinity of the head insert hole, the location and shapes of the connecting member and the head are limited. When a printed circuit board (10) and the connector (6a) are arranged in a manner that they are lying on top of a disk (1) in the direction of thickness of the cassette (2), the lateral width of the cassette (2) does not increase but the thickness of the cassette (2) must considerably increase. In this case, the rigidity of the cassette (2) must be strengthened. Furthermore, the user may touch the disk or the contact erroneously because he/she can pinch the shutter (3) to open it which may result in a decrease in reliability because of contamination. Also, the shutter opening/closing mechanism of the disk drive apparatus is complex because it is opened and closed in the direction perpendicular to the direction of the insertion of the shutter, resulting in increased cost.

In reference 4, the lateral width covering the head insert window (33) is sufficient for the shutter (34), but the latitudinal width of the accommodation body (32) must be corresponding to the longitudinal width of the outer terminal (36).

SUMMARY OF THE INVENTION

It is an object of the present invention to provide a disk cartridge that is highly reliable and dust-proof in which (1) a shutter does not contact with a recording surface of a disk, (2) is not easily opened to allow fingers to touch the recording disk, and (3) where a gap is not formed between the shutter and a case thereby preventing dust from attaching on the recording surface and as a result, preventing reading errors in reproducing.

It is another object of the present invention to provide a small size disk cartridge, which accommodates a disk-like recording medium and an electronic circuit part, having high reliability and in which the electronic circuit part may be freely position and in which the shape (width) of the shutter and the case is small.

It is still another object of the present invention to provide a disk cartridge, which has two shutters, having a single energizing means which can close both of the shutters and having a small number of parts.

It is still another object of the present invention to provide a disk cartridge having high operational reliability in which a shutter is not easily opened and closed to prevent a user from erroneously opening the shutter and contaminating the disk recording medium and the electronic circuit part when it is not installed in the disk drive apparatus.

According to the present invention, in order to achieve the objects described above, a disk cartridge accommodating a disk-like recording medium therein and used being installed in a disk drive apparatus includes: a flat tray having an accommodation concave portion for rotatably accommodating the disk-like recording medium form on one plane of the flat tray, and a tray side head insert hole and a tray side driving shaft insert hole form in predetermined positions on the other flat tray plane; a case with a size selected to accommodate the tray, having a tray insert hole for inserting the tray formed on one side and a case side head insert hole and a case side driving shaft insert hole formed in positions which correspond to the tray side insert hole and the tray side driving shaft insert hole; and a shutter slidably provided between a plane on a side opposite to the concave portion of the tray and the case. The shutter slides to simultaneously open and close the tray side head insert hole, the tray side driving shaft insert hole, the case side head insert hole and the case side driving shaft insert hole.

In the present invention, the shutter is slidably provided between the tray and the case on the opposite side to the disk accommodating concave portion of the tray as described above. In other words, the tray is interposed between the disk-like recording medium (referred to as "a recording disk" hereinafter) and the shutter. Accordingly, the shutter does not directly contact the recording disk as in conventional disk cartridges. This prevent scratches on the recording disk caused by the shutter which decreases reproduction errors.

Also, the shutter is not externally exposed so that the shutter is not accidentally opened allowing a user to touch or contaminate the recording-disk with fingers or the like. Furthermore, even if the shutter is to be transformed inward or outward, the transformation is prevented by the case or the tray, and a high dust-preventing effect is produced.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
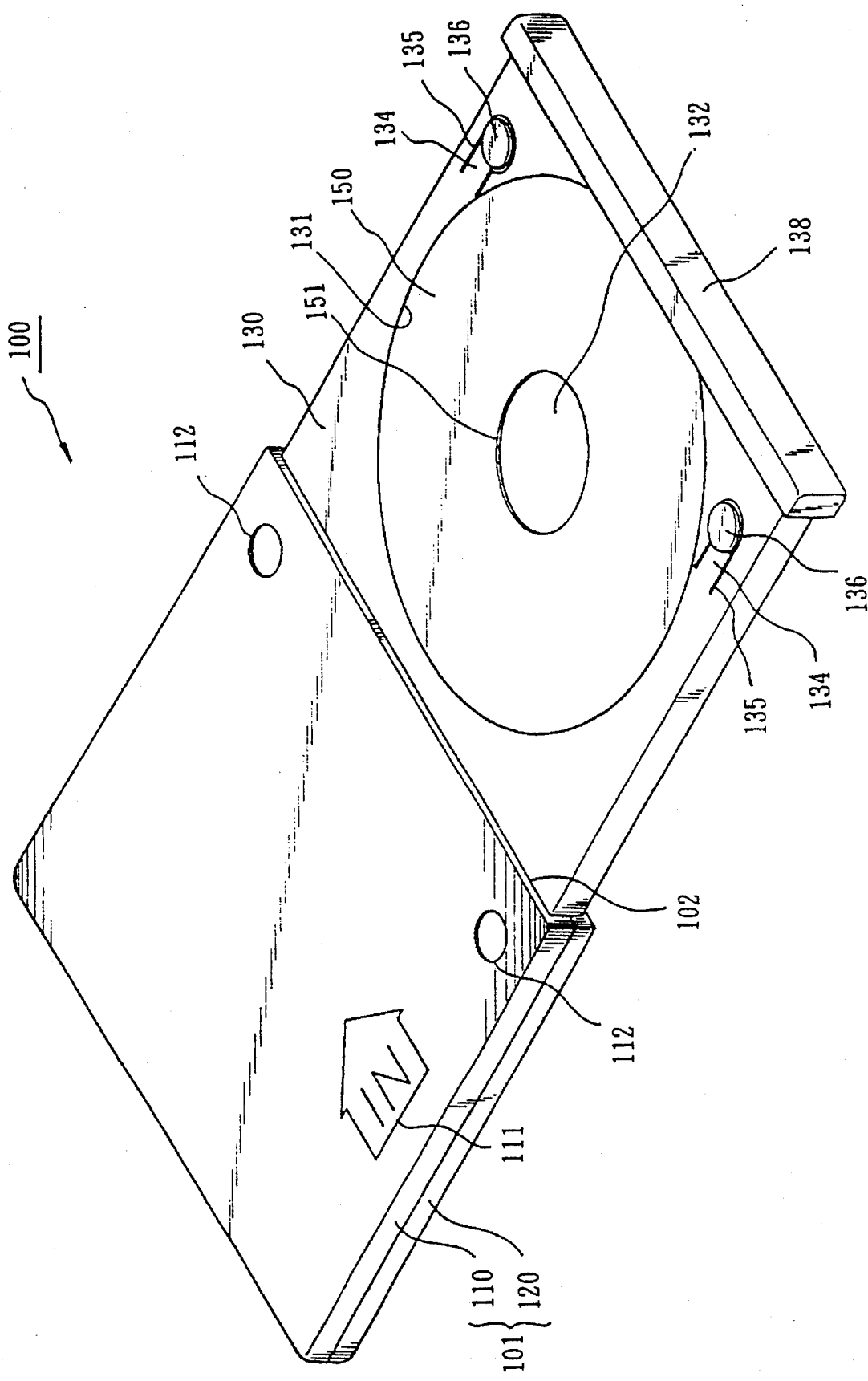
FIG. 1 is a perspective view of a disk cartridge 100 of one embodiment of the present invention.
Figure 2:
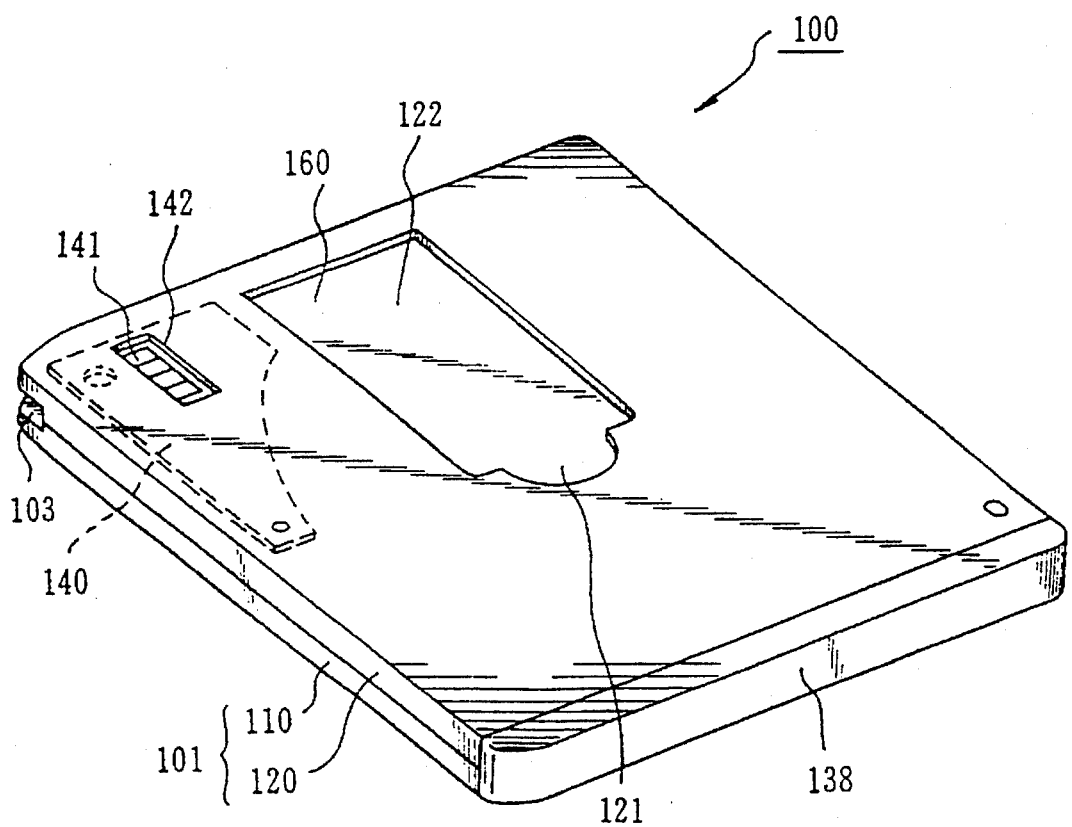
FIG. 2 is a perspective view seen from the bottom of the embodiment of FIG. 1.

FIG. 1 and FIG. 2 are diagrams showing the outline of a disk cartridge 100 according to an embodiment of the present invention, where FIG. 1 is a perspective view seen from above and FIG. 2 is a perspective view seen from the bottom.

Next, referring to FIG. 1 and FIG. 2, the outline of the disk cartridge 100 will be described. In FIG. 1, the disk cartridge 100 according to the present invention includes a case 101. In the case 101, its sectional shape is formed nearly U-shaped and a tray insert hole 102 is formed on its one side. The case 101 includes an upper half 110 and a lower half 120 made of the synthetic resin. In the upper half 110, its plane shape is selected to be nearly square and an insert direction display portion 111 including an arrow indicating a direction of the insertion of the disk cartridge into a recording/reproducing apparatus and with the letters "IN" being formed on its upper surface. Furthermore, tray locking holes 112 for locking are formed in two separated positions along a side in the vicinity of the tray insert 102. In the lower half 120, as shown in FIG. 2, a case side driving shaft insert hole 121 and a case side head insert hole 122 are continuously formed. A printed board 140 provided with external memory elements (not shown) and the like is also attached to the lower half 120, and a contact terminal 141 is provided in a certain position on the under surface of the printed board 140.

A tray 130 to be inserted and extracted in and from the case 101 is made of a synthetic resin material, for example, where a circular accommodation concave portion 131 for accommodating a recording disk is formed nearly at its center on the upper surface, and a tray side driving shaft insert hole 132 and a tray side insert hole 133 (refer to FIG. 3) are continuously formed in positions corresponding to the case side driving shaft insert hole 121 and the case side head insert hole 133. Elastic members 134 which correspond to the tray locking holes 112 are provided in two positions separated on the right and left in this side on the upper surface of the tray 130. Slits 135 are formed around the elastic members 134 so that they are displaced to have the elastic force when being pressed. Locking projections 136 for engaging with the tray locking holes 112 are provided on the upper surfaces of the elastic members 134, respectively. A recording disk 150 such as an optical disk is insertably and dischargeably accommodated in the accommodation concave portion 131 in the tray 130.

The disk cartridge 100 can be installed in the drive apparatus with the recording disk 160 being accommodated in the tray 130 and which tray 130 being inserted and locked in the case 101. Alternatively, depending on the structure of the drive apparatus, the recording disk 160 can be installed in the drive apparatus by itself after extracting the tray 130 from the case 101 after releasing the lock to the case 101 by pressing the elastic members 134 and then taking out the recording disk 160 from the tray 130.

Figure 3:
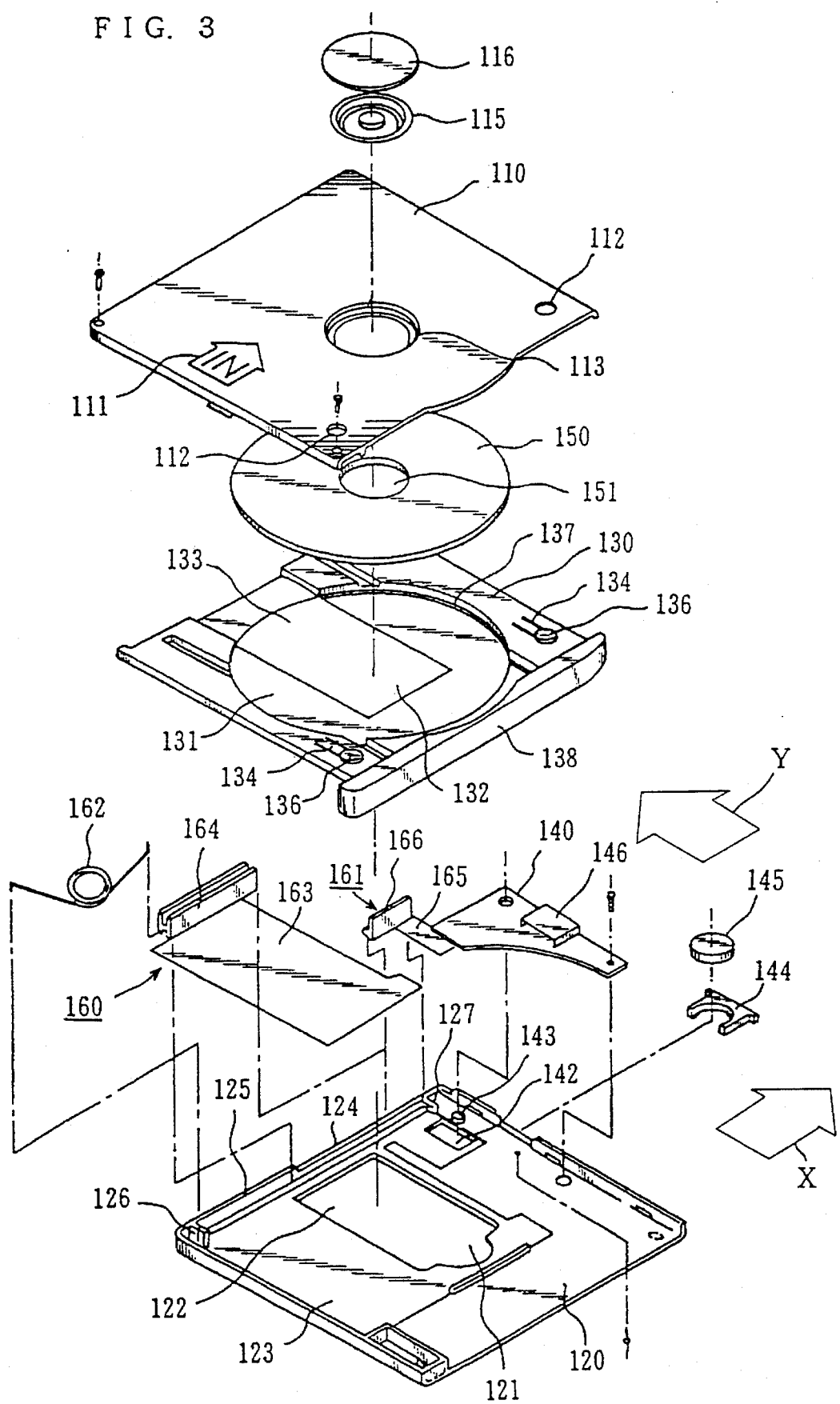
FIG. 3 is an exploded perspective view of the embodiment of FIG. 1.
Figure 4:
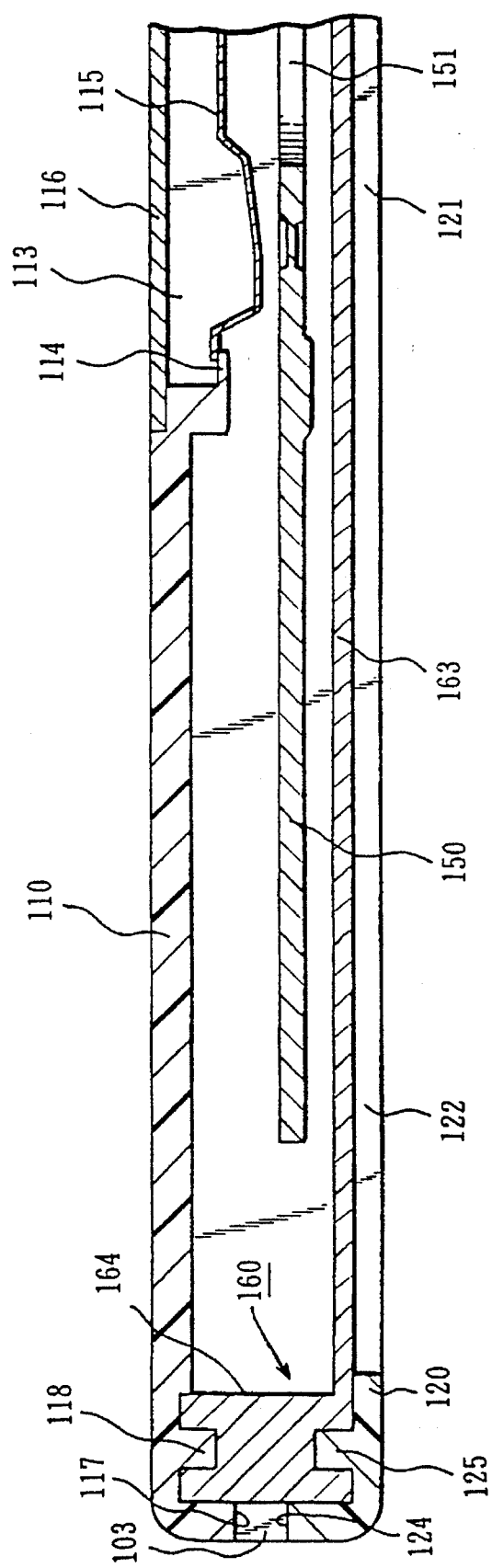
FIG. 4 is a partial sectional view of a recording disk 150 before clamping in the embodiment of FIG. 1.
Figure 5:
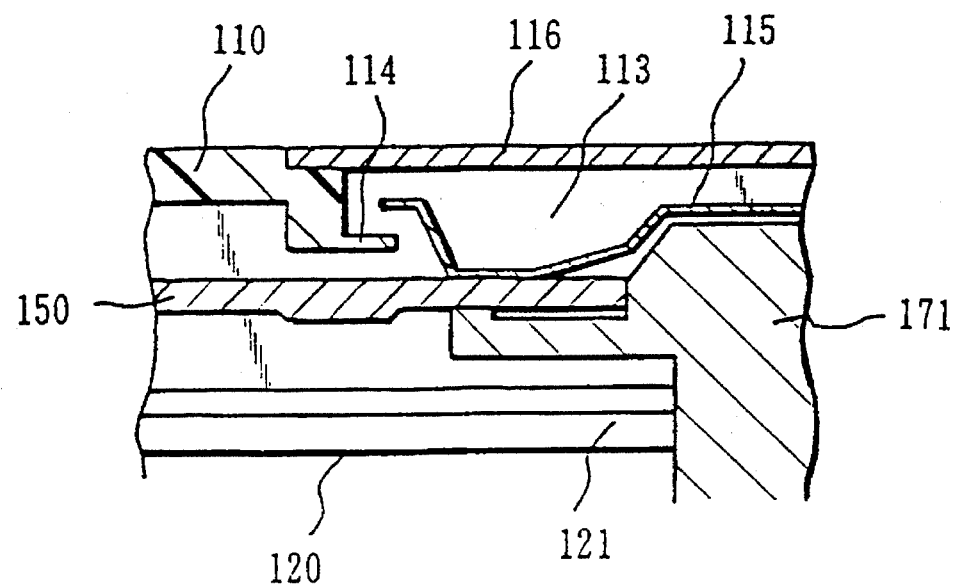
FIG. 5 is a partial sectional view showing the recording disk 150 being clamped in the embodiment of FIG. 1.
Figure 6:
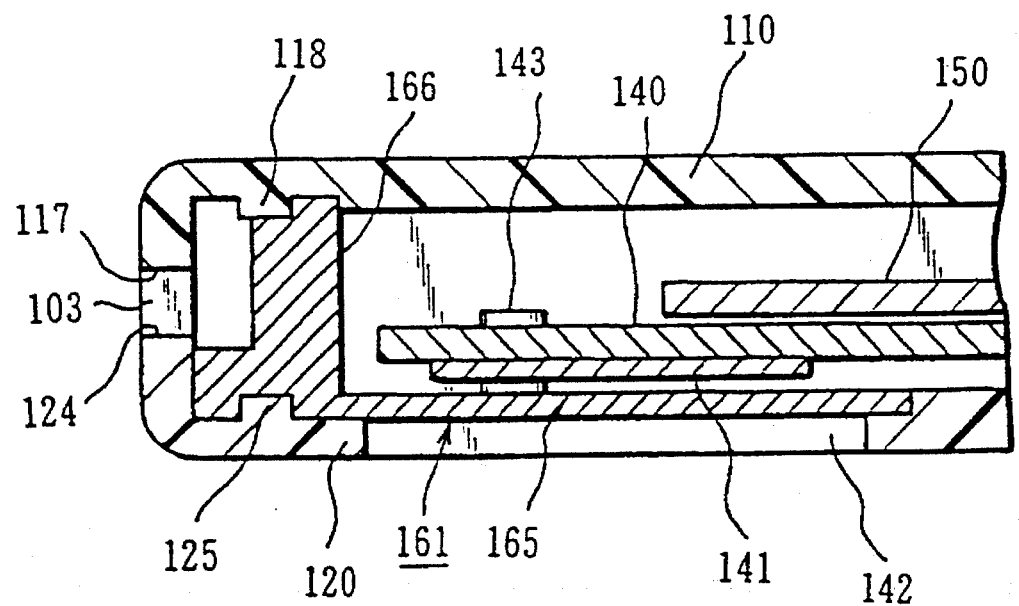
FIG. 6 is a partial sectional view showing a second shutter 161 being supported in the embodiment of FIG. 1.
Figure 7:
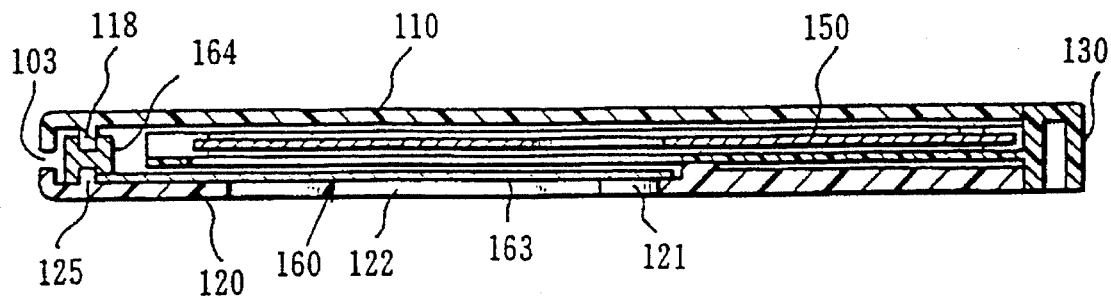
FIG. 7 is a longitudinal sectional view of the embodiment of FIG. 1.
Figure 8:
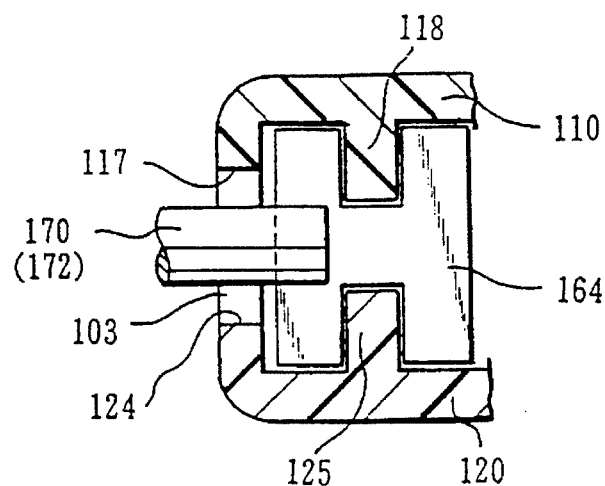
FIG. 8 is an enlarged sectional view for illustrating the opening operation of the shutter in the embodiment of FIG. 1.
Figure 9:
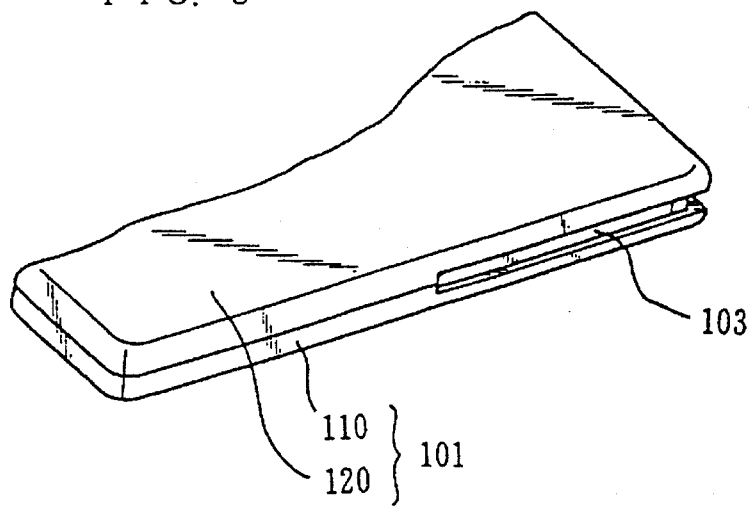
FIG. 9 is a partial perspective view of a rear part of the embodiment of FIG. 1.

FIG. 3 through FIG. 9 are diagrams illustrating the disk cartridge 100 of the present invention in detail, where FIG. 3 is an exploded perspective view of the disk cartridge, FIG. 4 is a partial sectional view showing the recording disk before clamping, FIG. 5 is a partial sectional view showing the recording disk being clamped, FIG. 6 is a partial sectional view showing a second shutter being supported, FIG. 7 is a longitudinal sectional view of the disk cartridge, FIG. 8 is an enlarged sectional view for illustrating the opening operation of the shutter in the disk cartridge, and FIG. 9 is a partial perspective view of a rear part of the disk cartridge.

Referring to FIG. 3 through FIG. 9, the specific structure of the disk cartridge 100 according to the present invention will be described. In FIG. 3, a circular opening 113 which is larger than the driving shaft insert hole 151 of the recording disk 150 is formed at an approximately center position in the upper half 110. A step portion 114 is formed in the opening 113 (refer to FIG. 4), in which a clamper 115 is rotatably supported. A cover plate 116 is fixed to the opening 113 by appropriate means such as welding so that the clamper 115 does not fall off. The clamper 115 is supported on the step portion 114 by means of its self-weight when it is not used (refer to FIG. 4), and it cooperates with a driving shaft 171 of the drive apparatus to elastically sandwich the recording disk 150 in use (refer to FIG. 5).

A concave portion 123 for permitting the first shutter 160 to slide is formed in an area including the case side driving shaft insert hole 121 and the case side head insert hole 122 inside the lower half 120. A cut portion 124 is formed on the upstream side of the direction of the insertion of the disk cartridge on the rear wall of the lower half 120. Furthermore, a guide wall 125 which is lower than the rear wall is formed continuously from one side wall to the other side wall in some nearer side of the rear wall. A similar cut portion 117 and a guide wall 118 (refer to FIG. 7 and FIG. 8) are also formed in the upper half 110.

A spring stopper 126 and a stopper 127 are provided on both ends of the guide wall 125. Furthermore, a quadrilateral terminal hole (or a terminal insert hole) 142 and a projection 143 for positioning are formed in the side of the stopper 127. This projection 143 is used to position the printed board 140 having a memory in which information can be elastically erased, i.e., EEROM. A plurality of contact terminals 141 are provided on the lower surface of the printed board 140. These contact terminals 141 are exposed from the terminal hole 142 (refer to FIG. 2).

The terminal hole 142 is opened and closed by a second shutter 161. The second shutter 161 and a first shutter 160 can slide in the same direction on the guide wall 125 (refer to FIG. 4, FIG. 6 and FIG. 8). Both of the shutters 160 and 161 are energized by a single spring 162 in the closing direction. In the description, in FIG. 2, the second shutter 161 is show being slid to open the terminal hole 142. That is to say, when the disk cartridge 100 is not used, the terminal hole 142 is closed by the second shutter 161.

A cell holder 144 is inserted together with a cell 145 into a frame 146 provided on the printed board 140 by pushing in from the side of the lower half 120 with the button type cell 145 accommodated therein.

A tray side driving shaft insert hole 132 and a tray side head insert hole 133 are continuously formed nearly at the center of the tray 130. An accommodation concave portion 131 which is nearly C-shaped is formed in the area excepting the tray side driving shaft insert hole 132 and the tray side head insert hole 133.

A continuing or discontinuing disk support portion 137 is formed on the periphery of the accommodation concave portion 131 except the tray side head insert hole 133 so that the bottom surface of the recording disk 150 does not come in direct contact with the bottom surface of the accommodation concave portion 131 when it is accommodated in the accommodation concave portion 131 (refer to FIG. 7).

The first shutter 160 includes a shutter plate 163 and a slider 164. The shutter plate 163 is continuously struck from a thin sheet-like material, which has a shape or an area certainly covering the case side driving shaft insert hole 121 and the case side head insert hole 122. The slider 164 has its sectional shape being almost H-shaped, and which is connected to the shutter plate 163 by means of appropriate means such as ultrasonic welding or adhesion, for example.

The second shutter 161 also includes a shutter plate 165 and a slider 166 like the first shutter 160. The shutter plate 165 has an area certainly covering the terminal hole 142, which is connected with the slider 166 having its sectional shape being almost H-shaped by appropriate means such as ultrasonic welding or adhesion, for example.

Although separated shutter plates 163 and 165, and sliders 164 and 166 are prepared and integrated in the embodiment described above, the shutter plates 163, 165 and the sliders 164, 166 can be integrally formed if the thickness of the shutter plates 163 and 165 can be made relatively large in design.

The first shutter 160 and the second shutter 161 slide on the same path along the guide walls 118 and 125. With a spring 162 provided between one end of the slider 164 and the spring stopper 126, the spring 162 elastically energizes the first shutter 160 to the home position side (the closing position side) and the other end of the slider 164 abuts on end of the slider 166 to energize the second shutter 161 to the home position side. The other end of the slider 166 abuts on the stopper 127. As described above, by positioning the shutters 160 and 161 with the other end of the slider 164 abutting on end of the slider 166 and the other end of the slider 166 abutting on the stopper 127, the case side driving shaft insert hole 121, the case side head insert hole 122 and the terminal hole 142 in the lower half can be closed together without causing the edges of the thin shutter plates 163 and 165 to directly abut on the end portion of the concave portion 123 in the lower half 120.

Now, if the first shutter 160 and the second shutter 161 are positioned by making the edges of the shutter plates 163 and 165 directly abut on the end portion of the concave portion 123, the edges of the thin shutter plates 163 and 165 tend to curl inward to possibly form a gap while repeatedly opening and closing the shutters 160 and 161. If the shutters 160 and 161 are positioned by making the edges of the shutter plates 163 and 165 abut on the end portion of the concave portion 123 with the slider 164 being pushed by the spring 162, a shearing stress is produced at the connecting portions of the shutter plates 163 and 165 may detach from the sliders 164 and 166.

Accordingly, in this embodiment, in order to solve the problem described above, the other end of the slider 164 is made to abut on one end of the slider 166 and the other end of the slider 166 is made to abut on stopper 127 of the lower half 120 to prevent the edges of the shutter plates 163 and 165 from directly abutting.

The assembly of the disk cartridge 100 of the present invention will now be described. First, with the lower grooves of the sliders 164 and 166 placed on the guide wall 125 of the lower half 120, the first shutter 160 and the second shutter 161 are provided on the concave portion 123 and the spring 162 is provided between the spring stopper 126 and one end of the slider 164. Subsequently, the printed board 140 is positioned with the projection 143, and the contact terminal 141 is exposed at the terminal hole 142 as shown in FIG. 2.

Then, the upper half 110 is provided on the lower half 120 so that the guide wall 118 is inserted in the upper grooves of the sliders 164 and 166 (refer to FIG. 8), and the side walls and the rear walls are joined through appropriate mans such as the ultrasonic welding. Thus, the sliders 164 and 166 are engaged with the upper half 110 and the lower half 120. By joining the upper half 110 and the lower half 120, the case 101 is formed having its sectional shape being U-shaped. Also, as shown in FIG. 9, the cut portions 117 and 124 of the rear walls of the upper half 110 and the lower half 120 fit to each other to form a shutter opening groove 103 which is opened in one wall surface.

The recording disk 150 is inserted in the accommodation concave portion 131 and supported on the disk support portion 137 (refer to FIG. 1), and then the tray 130 is inserted into the tray insert hole 102. When the tray 130 is inserted in the case 101, the locking projections 136 fit in the tray locking holes 112 and lock, where the insertion position of the tray 130 is secured. Also, the tray insert hole 102 is closed by the handle portion 138 of the tray 130 (refer to FIG. 2). Thus, the assembly of the disk cartridge has been completed.

Next, the operation in use of the disk cartridge 100 of the present invention will be described. When the disk cartridge 100 with the recording disk 150 accommodated therein is installed in the recording/reproducing apparatus (not shown), the disk cartridge is inserted in the recording/reproducing apparatus in the direction of the insert direction display portion 111 (refer to FIG. 1) with the surface of the upper half 110 facing upward.

A first shutter opening pin 170 and a second shutter opening pin 172 are provided in a projecting manner on a cartridge insert path in the recording/reproducing apparatus (refer to FIG. 8). The second shutter opening pin 172 is longer than the first shutter opening pin 170, and which is formed in the deeper part in the direction of insertion of the disk cartridge. When the disk cartridge 100 is inserted, the first shutter opening pin 170 comes in the shutter opening groove 103 to abut on the end of the slider 164. At this time because the slider 166 has a sectional H-shape, the shorter, first shutter opening pin 170 does not abut the slider 166.

When the disk cartridge 100 is further inserted, the slider 164 and the shutter plate 163 slide in the concave portion 123 against the elastic force of the spring 162 to simultaneously open the case side driving shaft insert hole 121, the case side head insert holes 122, the tray side driving shaft insert hole 132 and the tray side head insert hole 133. When the first shutter 160 is half opened, the second shutter opening pin 172 comes in the shutter opening groove 103 to abut on the end of the slider 166. Subsequently, the first shutter 160 and the second shutter 161 simultaneously continue opening, and when the disk cartridge 100 is completely inserted in the recording/reproducing apparatus, the first shutter 160 and the second shutter 161 completely open. In this condition, the information is recorded in or reproduced from the recording disk 150. The first and second shutters 160 and 161 are accommodated in the concave portion 123 so that some gap is formed between the tray 130 and the shutters 160 and 161 (refer to FIG. 7), therefore the shutters do not come in contact with the tray 130 when sliding.

When the disk cartridge 100 is extracted from the recording/reproducing apparatus by pressing an inject lever (not shown), the shutter opening pins 170 and 172 relatively come out of the shutter opening groove 103 and the first and second shutters 160 and 161 are returned to the home position by the elastic force of the spring 162 accordingly to simultaneously close the driving shaft insert holes 121, 132, the head insert holes 122, 133, and the terminal hole 142. In this condition, the disk cartridge 100 is taken out.

Now, when the recording disk is changed, the tray 130 is pulled out from the tray insert hole 102 while pressing the locking projections 136. At this time the shutters 160 and 161 are always engaging with the upper and lower guide walls 118 and 125 as shown in FIG. 7, so that they are left in the case 101 even when the tray 130 is extracted, and the driving shaft insert hole 132 is opened without being hindered by the shutters 160 and 161. Accordingly, a user can take out the recording disk 150 easily from the tray 130 by inserting a finger in the driving shaft insert aperture 151 and the driving shaft insert hole 132.

Figure 10:
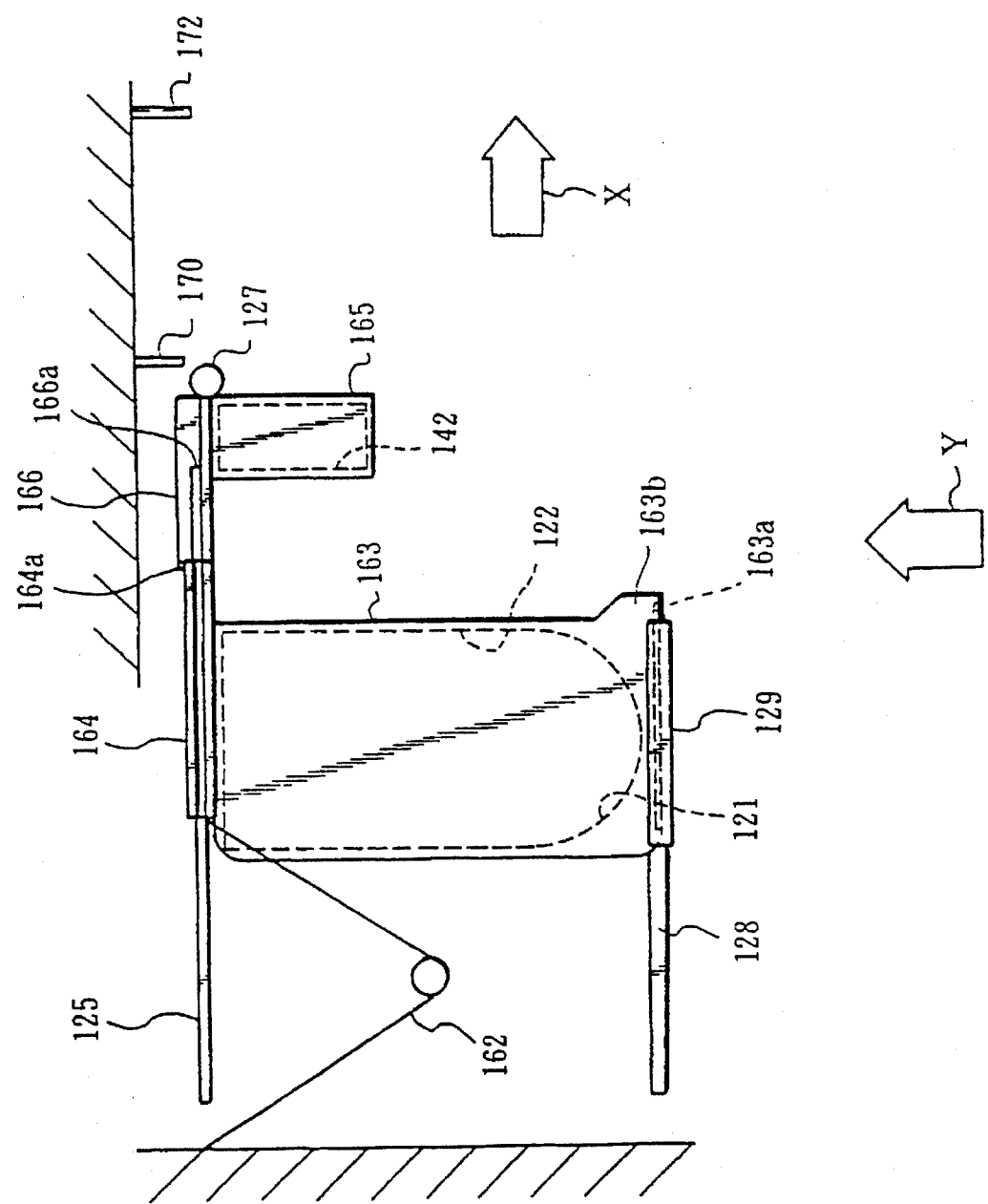
FIG. 10 is a diagram showing a first shutter and a second shutter in the closed positions.
Figure 11:
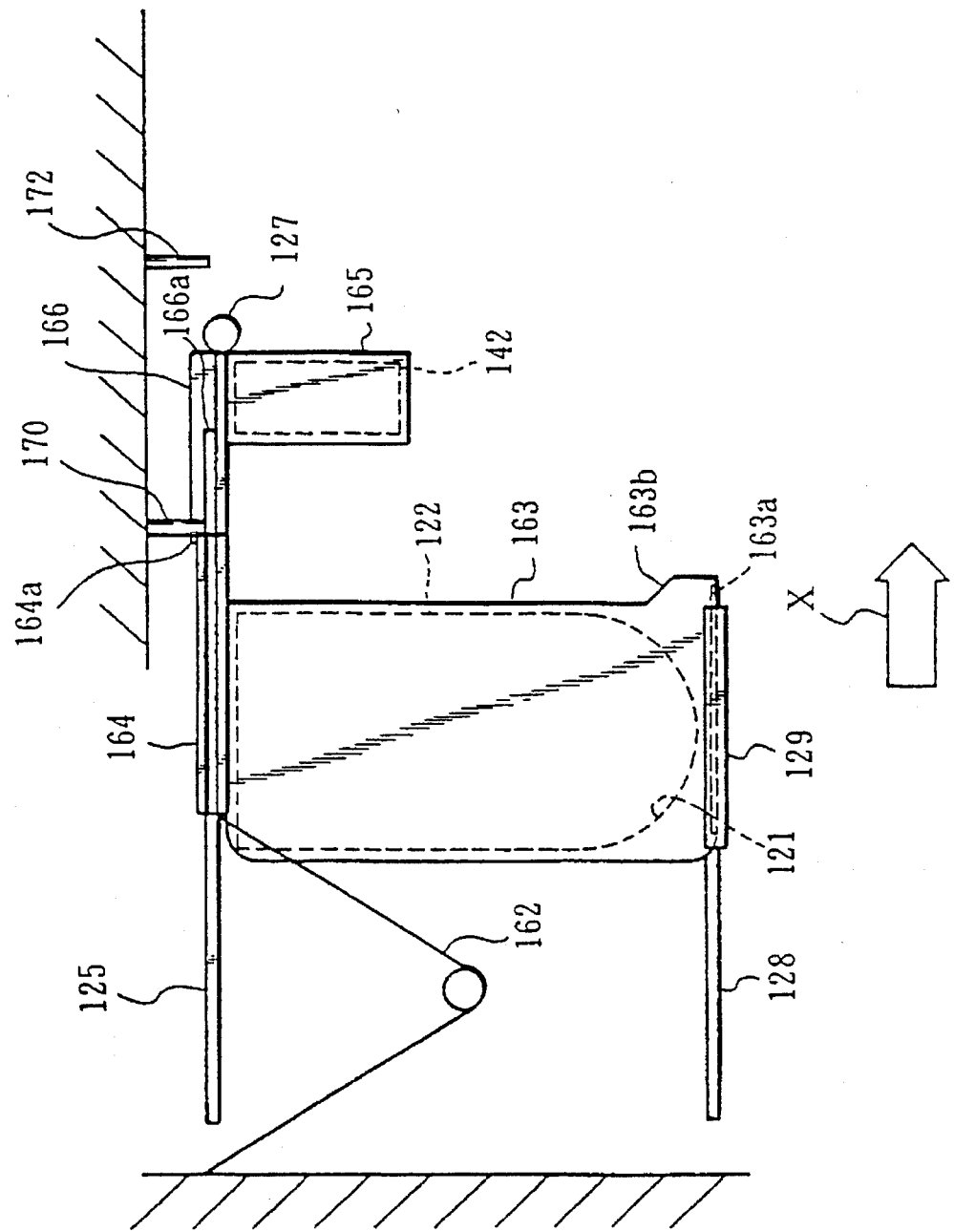
FIG. 11 is a diagram showing the first shutter immediately before moving.
Figure 12:
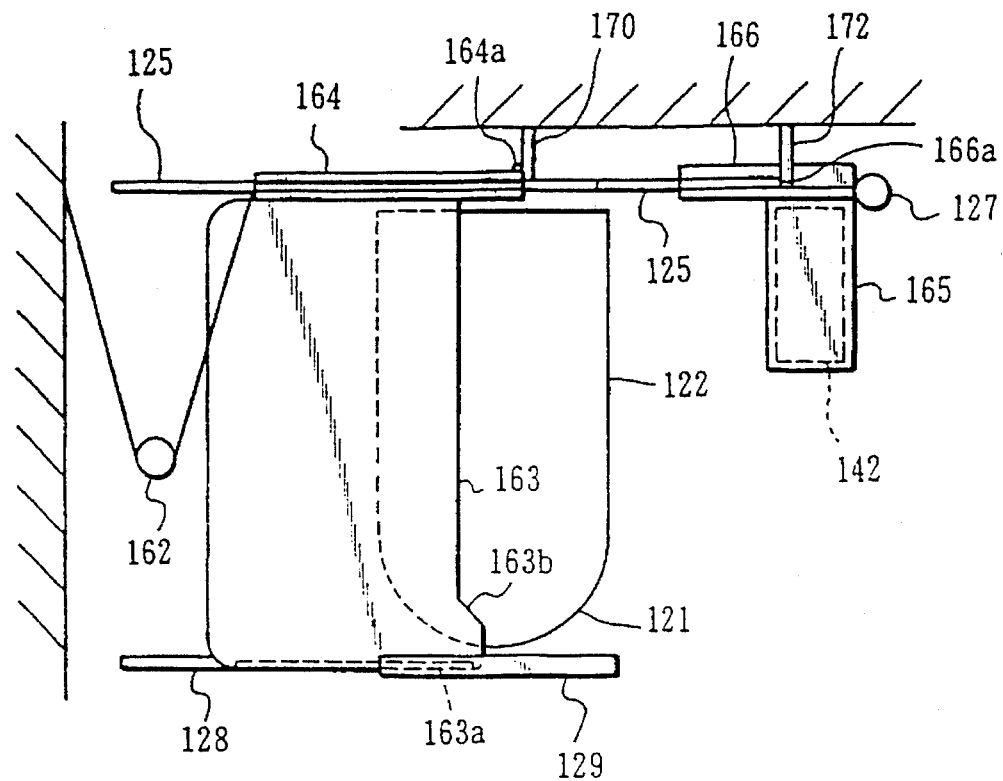
FIG. 12 is a diagram showing the second shutter immediately before moving.
Figure 13:
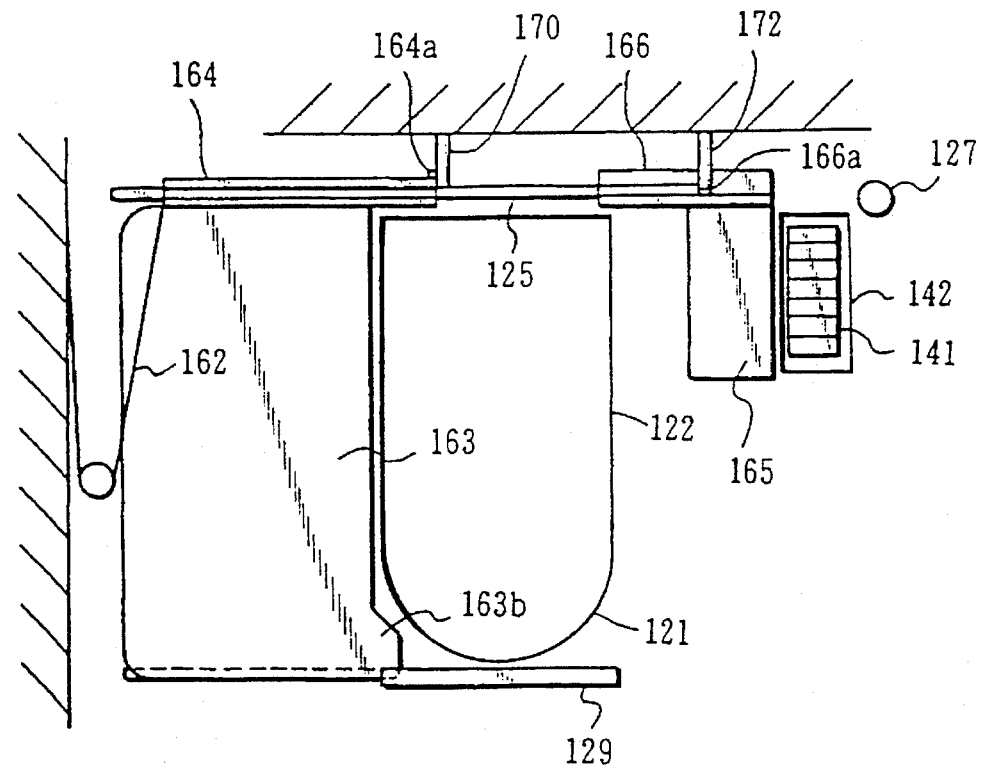
FIG. 13 is a diagram showing the first shutter and the second shutter in opened positions.
Figure 14:
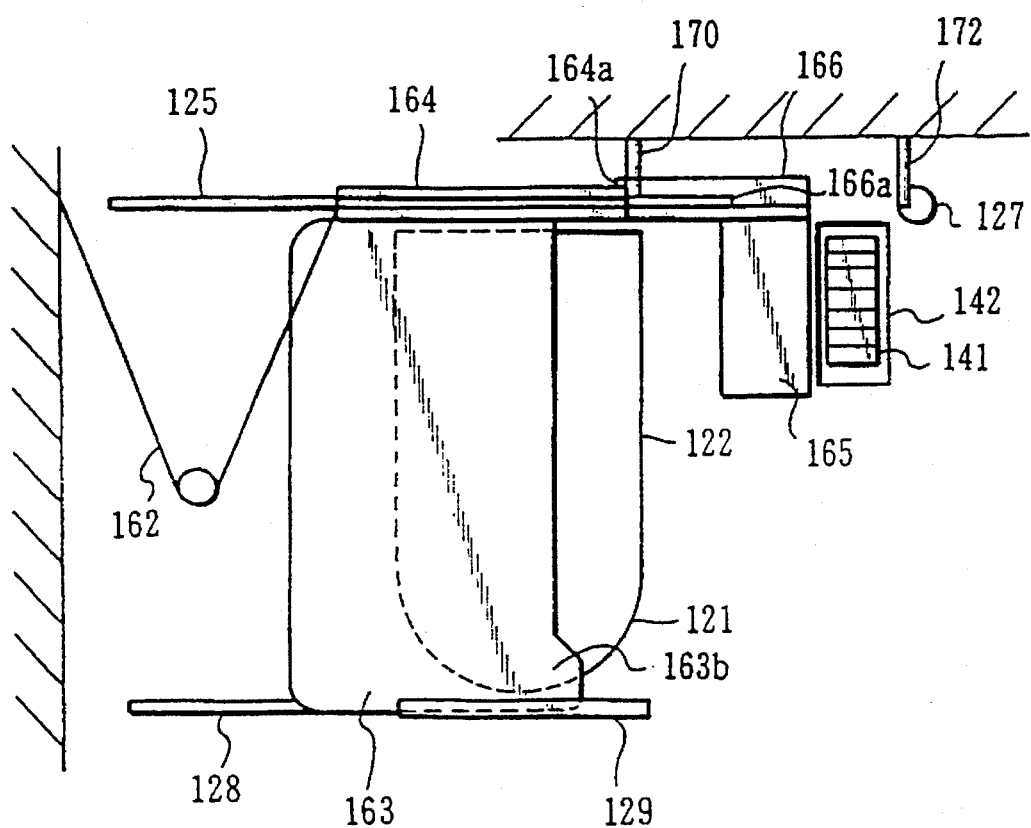
FIG. 14 is a diagram showing the first shutter and the second shutter in the middle of the closing operation.

FIG. 10 through FIG. 14 are diagrams for illustrating the opening/closing operation of the first shutter 160 and the second shutter 161, and particularly, FIG. 10 shows the opening and closing of the first shutter 160 and the second shutter 161, FIG. 11 shows the first shutter 160 immediately before moving, FIG. 12 shows the second shutter immediately before moving, FIG. 13 shows the first shutter 160 and the second shutter 161 at the opened position and FIG. 14 shows the first shutter 160 and the second shutter 161 closed. Referring to these FIGS. 10 through 14, the opening and closing operation of the first shutter 160 and the second shutter 161 will be described below in more detail.

First, referring to FIG. 10 through FIG. 13, the operation when the first shutter 160 and the second shutter 161 are opened will be described. Before the disk cartridge 100 is inserted in the drive apparatus (refer to FIG. 10), the first shutter 160 closes the case side driving shaft insert hole 121 and the case side head insert hole 122 and the second shutter 161 closes the terminal hole 142. The spring 162 is interposed between the first shutter 160 and the side wall of the case 101. The first shutter 160 and the second shutter 161 are energized in the closing direction by the elastic force of the spring 162. In the closed position, the first shutter 160 and the second shutter 161 abut on each other and are held between the spring 162 and the stopper 127 projectingly provided in the lower half 120. A nail portion 163a formed on the lower surface of the free end of the shutter plate 163 is slidably inserted in a guide groove 128 formed on the lower half 120, and positioned below the shutter holder 129.

In the drive apparatus, the first shutter opening pin 170 which is relatively short for pushing the first shutter 160 open and the second shutter opening pin 172 which is relatively long for pushing the second shutter 161 open are provided. The first shutter opening pin 170 and the second shutter opening pin 172 are formed at a certain interval on the same line along the cartridge insert direction X, and which project in the direction perpendicular to the cartridge insert direction X. As shown in FIG. 10 through FIG. 14, the first shutter opening pin 170 is arranged nearer to the cartridge insert hole (not shown) of the drive apparatus, and the second shutter opening pin 172 is arranged in the inner side than the first shutter opening pin 170.

When the disk cartridge 100 is inserted in the drive apparatus, the tip portion of the first shutter opening pin 170 is first inserted in the shutter opening groove 103. Since the first shutter opening pin 170 is short, it passes by the slider 166 without abutting thereon and abuts on a pin but projection 164a of the first shutter 160 as shown in FIG. 11.

When the disk cartridge 100 is further inserted, the first shutter 160 is moved in the direction for opening the case side driving shaft insert hole 121 and the case side head insert hole 122 by the first shutter opening pin 170. The spring 162 is elastically transformed by the first shutter 160 as the case side driving shaft insert hole 121 and the case side head insert hole 122 open. The second shutter opening pin 172 is inserted in the shutter opening groove 103 when the case side driving shaft insert hole 121 and the case side head insert hole 122 half open. The second shutter opening pin 172 projects longer than the first shutter opening pin 170, so that it abuts on a pin abut projection 166a of the slider 166 of the second shutter 161. The second shutter 161 stays still abutting on the stopper 127 until the second shutter opening pin 172 abuts on the pin abut projection 166a.

When the disk cartridge 100 is continuously inserted, as shown in FIG. 12, the first shutter opening pin 170 opens the first shutter 160 and the second shutter opening pin 172 opens the second shutter 161. When the disk cartridge 100 is inserted to a predetermined position, the case side driving shaft insert hole 121, the case side head insert hole 122 and the terminal hole 142 are completely opened as shown in FIG. 13. In this condition, the case side driving shaft insert hole 121 and the case side head insert hole 122 expose the disk 150 and the terminal hole 142 exposes the contact terminal 141. When the second shutter 161 is at the opened position, one end of the slider 166 abuts on a step formed in the middle of the guide walls 118 and 125 so that the second shutter 161 is prevented from moving further toward the case side driving shaft insert hole 121 and the case side head insert hole 122. Accordingly, at each opened position, the second shutter 161 is held between the step and the second shutter opening pin 172 and the first shutter 160 is held between the elastically transformed spring 162 and the first shutter opening pin 170. The second shutter 161 is located in a position where it does not close the case side head insert hole 122, that is, between the case side head insert hole 122 and the terminal hole 142.

Now, since the first shutter 160 is longer than the second shutter 161, its free end may rise. If the free end side rises, it may cause a problem that the tray 130 may be caught or the first shutter 160 may be transformed when the tray 130 is inserted in the direction of the arrow Y (refer to FIG. 3 and FIG. 10). In order to prevent such a problem, part of the first shutter 160 always engages with the shutter holder 129 wherever the first shutter 160 may be located in the structure. Specifically, when the first shutter 160 is at the closed position or half opened, its free end is positioned below the shutter holder 129. Also at the opened position, with the projection 163b, the first shutter 160 is maintained being engaged with the shutter holder 129. Because the first shutter 160 always engages with the shutter holder 129, the first shutter 160 does not interfere with the shutter holder 129 when returning to the closed position, resulting in smooth operation.

When the second shutter 161 opens to expose the terminal hole 142, the external terminal of the drive apparatus is inserted from the terminal hole 142. The external terminal comes in contact with the contact terminal 141 to transmit and receive data between the drive apparatus and the electronic circuit (a CPU, for example) on the printed board 140.

The data may be game data about a game, or may be index data of the disk 150, for example.

When discharging the disk cartridge 100 from the drive apparatus, as the disk cartridge 100 is pulled, from the opened state shown in FIG. 13, the first shutter 160, being interposed between the spring 162 and the first shutter opening pin 170, gradually closes the case side driving shaft insert hole 121 and the case side head insert hole 122 with the recovering force of the spring 162. The second shutter opening pin 172 separates away from the second shutter 161 as the disk cartridge 100 is pulled out. The second shutter 161 remains at the opened position, being abutted on the step formed on the guide walls 118 and 125.

When the disk cartridge is further pulled, the end of the slider 164 abuts on the end of the slider 166 as shown in FIG. 14. As the disk cartridge 100 is continuously pulled out, the second shutter 161 is pushed back by the recovering force of the spring 162 together with the first shutter 160.

The second shutter 161 is completely closed simultaneously with the first shutter 160, and is held in the closed state together with the first shutter 160 between the spring 162 and the stopper 127. When the disk cartridge 100 is further pulled, the first shutter opening pin 170 passes by the slider 166 to return to the state shown in FIG. 10. As described above, the first shutter 160 covers the case side driving shaft insert hole 121 and the case side head insert hole 122 and the second shutter 161 covers the terminal hole 142 being related to the operation of pulling out the disk cartridge 100.

Figure 15:
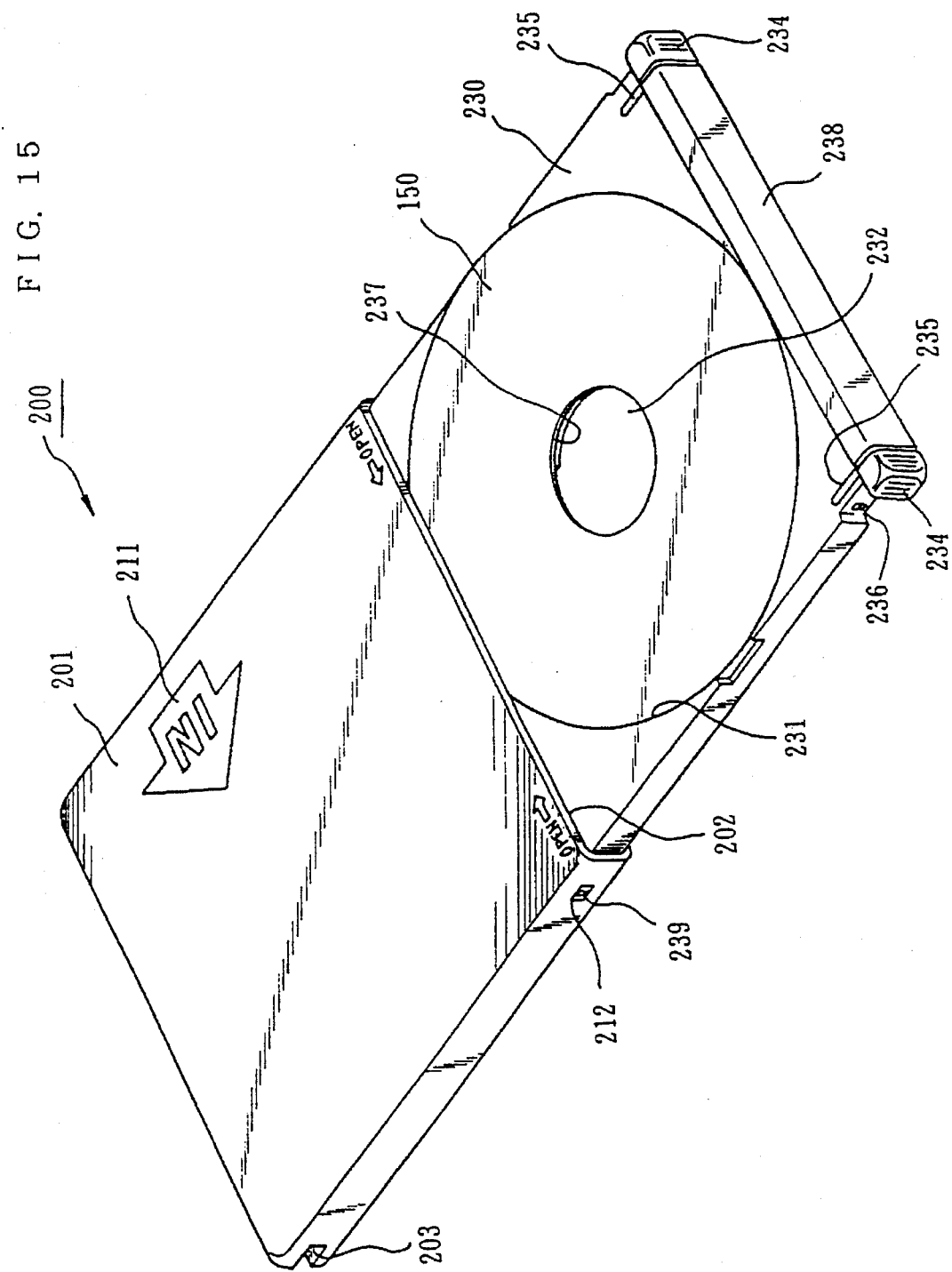
FIG. 15 is a perspective view of a disk cartridge 200 of another embodiment of the present invention.
Figure 16:
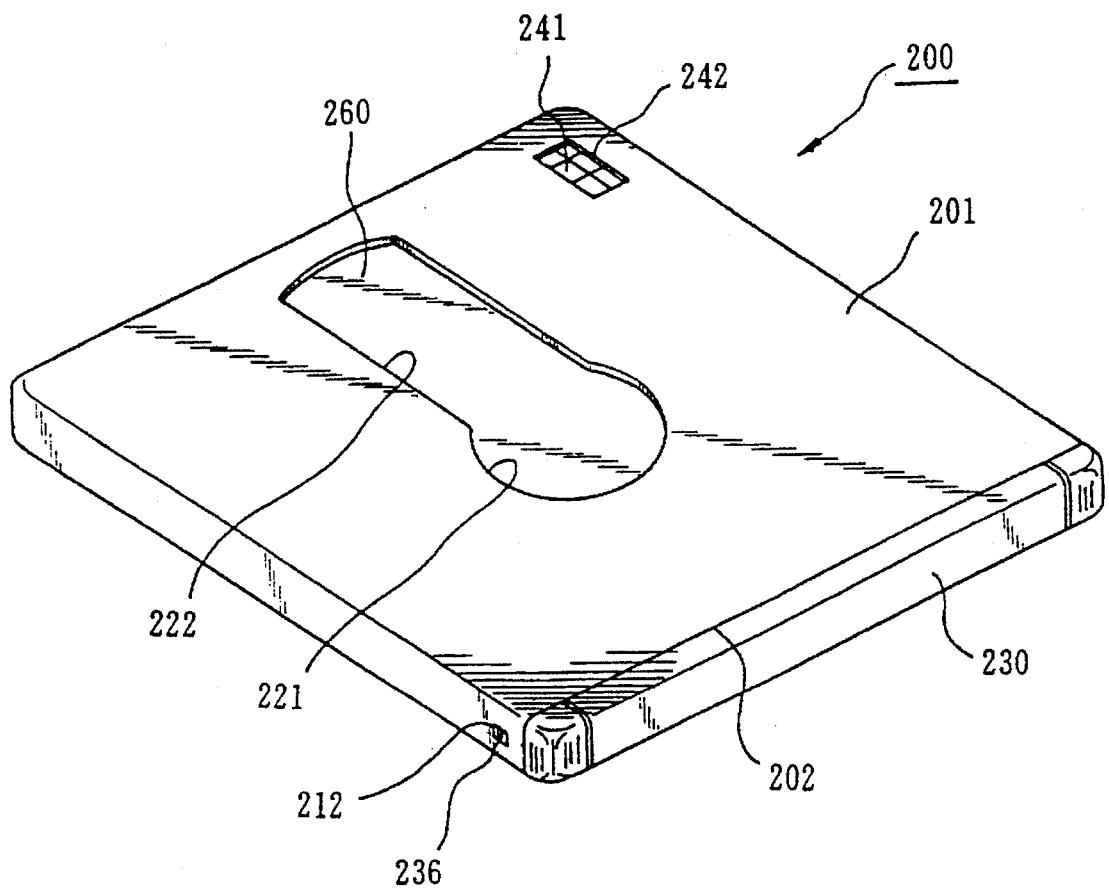
FIG. 16 is a perspective view seen from the bottom of the embodiment of FIG. 15.
Figure 17:
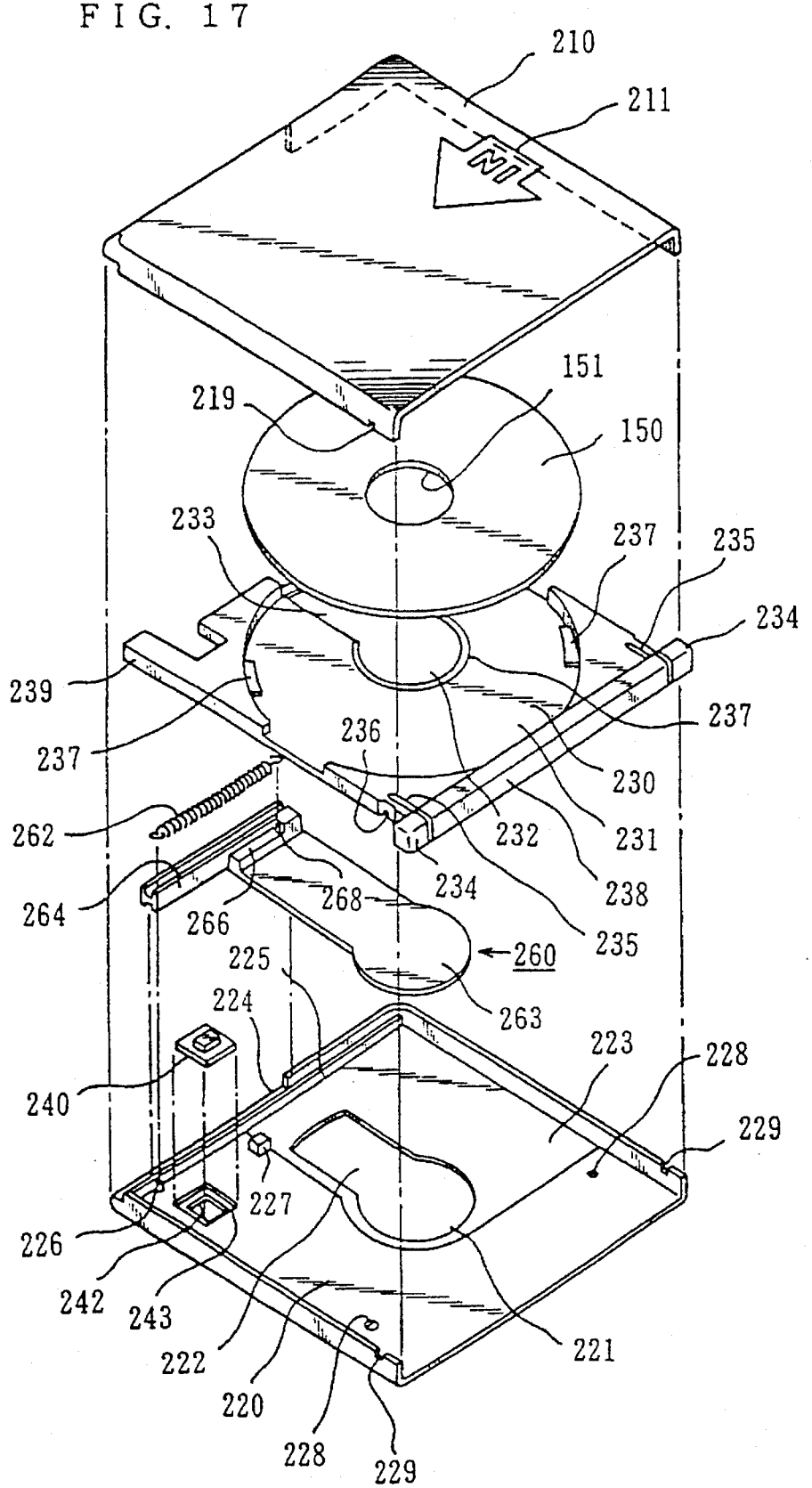
FIG. 17 is an exploded perspective view of the embodiment of FIG. 15.
Figure 18:
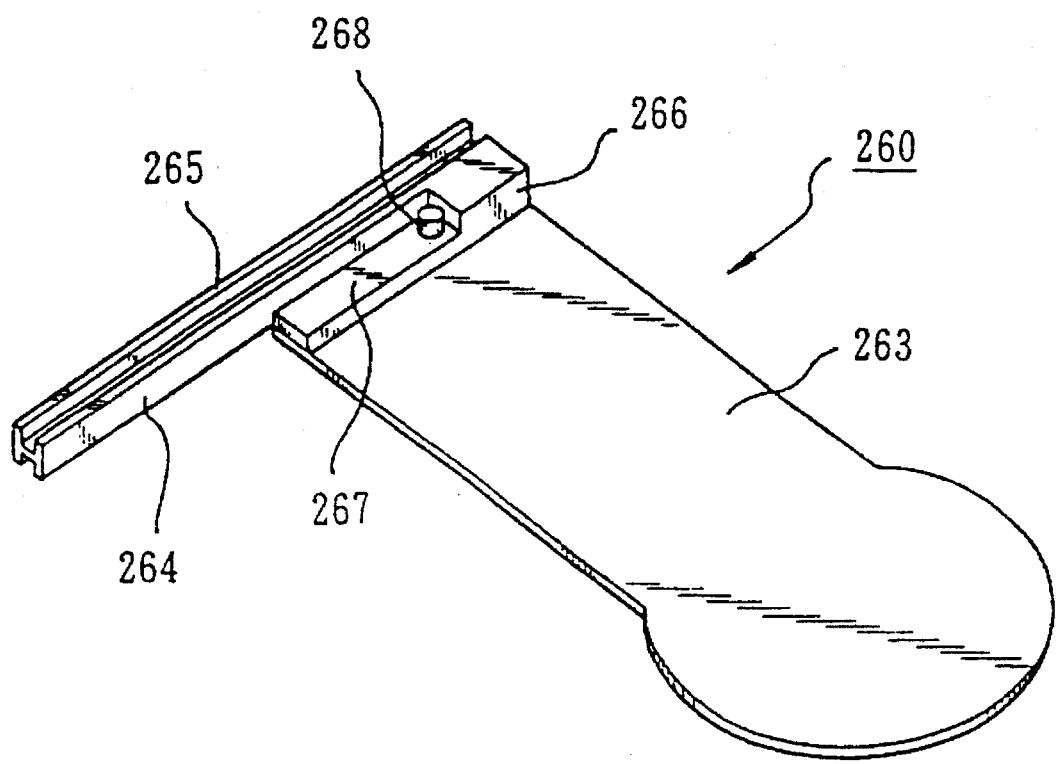
FIG. 18 is an enlarge perspective view of a shutter 260 in the embodiment of FIG. 15.

FIG. 15 through FIG. 18 are diagrams showing another embodiment of the present invention, where FIG. 15 is a perspective view seen from above, FIG. 16 is a perspective view seen from the bottom, FIG. 17 is an exploded perspective view of the disk cartridge and FIG. 18 is an enlarged perspective view of the shutter.

The embodiment of FIG. 15 is different from the embodiment of FIG. 1 in that the locking mechanism of the tray 130 is changed so that the lock can be released with a single hand. That is to say, a disk cartridge 200 according to this embodiment includes an upper half 210, a lower half 220, a tray 230, a printed board 240, a shutter 260, a recording disk 150 and the like as in the embodiment of FIG. 1.

More specifically, a circular case side driving shaft insert hole 221 is formed at the corner on the lower half 220, and a nearly rectangular case side head insert hole 22 is formed connected therewith. A handle portion 238 is formed on the end portion (in this side in the figure), and elastic members 234 are integrally formed on both ends thereof, respectively. The elastic members 234 are displaced when pressed inward to each other through slits 235 to have the elastic force. Locking projections 236 are formed on both sides of the elastic members 234 and projections 239 are formed on both rear sides of the tray 230.

As shown in FIG. 17, a concave portion 223 for permitting the shutter 260 to slide is formed in the area including the case side driving shaft insert hole 221 and the case side head insert hole 222 inside the lower half 220. In the nearer side than the driving shaft insert hole 221, a pair of reference holes 228 including a circular hole and an oval hole are formed at a predetermined interval.

Cut portions 219 and 229 are provided in this side on the lower ends of both side walls in the upper half 210 and in this side on the upper ends of the both side walls in the lower half 220, respectively (four in all). When joining the upper half 210 and the lower half 220 to form the case 201, the cut portions 219 and 229 face to each other to form tray locking holes 212 on both sides of the case 201 (refer to FIG. 15 and FIG. 16).

A cut portion 224 is formed in the upstream of the direction of the insertion of the disk cartridge on the rear wall of the lower half 220. A guide wall 225 which is lower in height than the rear wall is continuously formed from one side wall to the other side wall in some nearer side than the rear wall. A same cut portion 217 and a guide wall 218 are formed in the upper half 210.

A spring holding 226 and a stopper 227 are projectingly formed in this side of the guide wall 225. A step portion 243 surrounding the quadrilateral terminal hole 242 and the periphery thereof is formed in this side of the spring holding pin 226. A printed board 240 provided with a memory in which the information is electrically erasable (so called EEROM) is provided in the step portion 243. A plurality of contact terminals 241 are provided on the under surface of this printed board 240, which are exposed from the terminal hole 242 (refer to FIG. 16).

A circular tray side driving shaft insert hole 232 is formed nearly at the center on the tray 230, and an almost rectangular tray side head insert hole 233 is provided continuously to it. An accommodation concave portion 231 which is almost C-shaped is formed in the area surrounding the tray side driving shaft insert hole 232 and excepting the tray side head insert hole 233.

A continuous or discontinuous support portion 237 is provided being projecting on the periphery of the tray side driving shaft insert hole 232 excepting the portion connected to the tray side head insert hole 233 and the periphery of the accommodation concave portion 231 (in the embodiment, the inner support portion 237 is continuous and the outer support portion 237 is not continuous), so that the under surface of the recording disk 150 does not come in direct contact with the bottom surface of the accommodation concave portion 231 when it is accommodated in the accommodation concave portion 231.

A shutter 260 includes a shutter plate 263 and a slider 264 as in the embodiment of FIG. 1. As shown in FIG. 18, the slider 264 includes a sliding portion 265 and a plate attach portion 266 which is integrally formed on the inner side thereof. The sliding portion 265 has it width considerably longer than the width of the shutter plate 263 and its sectional shape selected to be almost H-shaped. One end of the shutter plate 263 is connected to the lower surface of the plate attach portion 266 by appropriate means such as the ultrasonic welding or adhesion.

A step portion 267 is formed on the upper surface of the plate attach portion 266 and a spring hanging pin 268 is formed on the upper surface thereof. A spring 262 is tensionally hung between the spring hanging pin 268 and the spring hanging pin 226 (refer to FIG. 17), and the shutter 260 is energized to the home position side (the closed position side) by the tensile force thereof. Thus, the end surface of the plate attach portion 266 abuts on the stopper 227 of the lower half 220. With the end surface of the plate attach portion 266 abutting on the stopper 227, the shutter 260 closes the case side driving shaft insert hole 221 and the case side head insert hole 222 without the edge of the thin shutter plate 263 directly abutting on the edge of the concave portion 223 as had been described in the embodiment of FIG. 1.

The assembly of the disk cartridge 200 is accomplished similarly to the embodiment of FIG. 1. When joining the upper half 210 and the lower half 220, the cut portions 219 and 229 fit to form tray locking holes 212 on both of the right and left sides refer to FIG. 15 and FIG. 16), which is different from the embodiment of FIG. 1. When inserted the tray 230 into the case 201, the projections 239 are put in the tray locking holes 212 to secure the position where the tray 230 has been completely pulled out. The recording disk 150 is put in the accommodation concave portion 231 in this condition and installed on the disk support portion 237 (refer to FIG. 15).

When the tray 230 is further inserted in the case 201, the locking projections 236 fit in the tray locking holes 212 and lock to secure the insertion completed position of the tray 230. Also, the tray insert hole 202 is closed by the handle portion 238 of the tray 230 (refer to FIG. 16). Thus, the assembly of the disk cartridge 200 finishes.

In this embodiment, the slider 264 which is relatively longer than the width of the shutter plate 263 slides along the upper and lower guide walls 218 and 225 so that the shutter 260 smoothly moves without rattling. Furthermore, the locking projections 236 fit in the tray locking holes 212 and the projections 239 elastically abut on the side walls of the case 201 so that the tray 230 is held with respect to the case 201, therefore the tray 230 does not rattle even if the recording disk 150 rotates at a high speed in recording and reproducing.

When taking out the recording disk 150 from the case 201, the elastic members 234 are pressed inward with respect to each other. Then, the locking projections 236 are displaced to the inner side of the tray locking holes 212 to release the lock. The tray 230 is then pulled in this side and the projections 239 are fit in the tray locking holes 212 as shown in FIG. 15. In this condition, the tray 230 is prevented from getting out of the case 201 and the recording disk 150 is completely exposed from the case 201.

According to the present invention, the shutter is slidably provided between the tray and the case on the opposite side to the accommodating concave portion of the tray. In other words, the tray is interposed between the recording disk and the shutter so that the shutter does not come in direct contact with the recording disk, with the result that the recording disk is prevented from being damaged when opening and closing the shutter. As a result, occurrence of the data reading errors due to scratches can be decreased.

Also, the shutter is not externally exposed, so that the shutter is not accidentally opened when it is not used; therefore the recording disk is not contaminated. Furthermore, bending or other transformation of the shutter inward or outward can be prevented by the case or the tray to produce a highly dust-proof environment. A sa result, a disk cartridge with high operation reliability is obtained.

Also, according to the present invention, when the second shutter for opening and closing the terminal insert hole is provided separately from the first shutter for opening and closing the head opening portion are different in the width dimension, and the lateral width dimension and the longitudinal width dimension are not large as in the conventional apparatus even if the terminal insert hole (recording portion) is provided. As a result, a compact disk cartridge having the lateral width dimension and the longitudinal width dimension the same as those of the cartridge case having no terminal insert hole provided can be obtained. Furthermore, if the disk cartridge is constituted as in the present invention, the shutter opening/closing system of the disk drive apparatus can be simplified to decrease the cost.

Furthermore, in the present invention, since the shutter accommodation concave portion is provided inside the cartridge case and the shutter is accommodated therein as described above, the shutter does not project out of the cartridge case as in the conventional art. Therefore the space efficiency is excellent requiring no increase in dimension which enables down-sizing of the disk cartridge.

With the shutter accommodation concave portion provided in the cartridge case, the part where the concave portion is formed in the case is thinner to decrease the mechanical strength, but the shutter provided in the accommodation concave portion has the reinforcing effect. Accordingly, the cartridge case is not transformed by an outer force.

Furthermore, the shutter is provided between the cartridge case and printed board, and the upper and lower surfaces of the shutter are regulated by the cartridge case and the printed board, therefore the shutter does not tend to slightly open as in the conventional art. Accordingly, it has an advantage that the functions of the shutter such as the dust-proof function and protection from the electrostatic breakdown are certainly effected.

While the invention has been shown and described in detail, the foregoing description is in all aspects illustrative and not restrictive. It is therefore understood that numerous modifications and variations can be devised without departing from the scope of the invention.

What is claimed is:

1. A disk cartridge which rotatably accommodates a disk-like recording medium therein and is installed in a disk drive apparatus to be used, comprising:

a flat case having a plane shape;

a head opening formed between a center portion of said case and a first side along an insert direction of said case into the disk drive apparatus on one main surface of said case;

a first shutter provided in the case slidably along said first side of said case for opening and closing said head opening;

a sliding direction regulator formed in said case along said first side for regulating a sliding direction of said first shutter;

a first slider formed integrally with said first shutter for guiding the first shutter to slide on said first sliding direction regulator;

an electronic circuit including a semiconductor element which is accommodated in said case excepting an area for accommodating said disk-like recording medium;

a terminal insert hole formed on the main surface of said case between a side of said disk cartridge at an end of said disk cartridge first inserted into the disk drive apparatus and said head opening in an area excepting a first area where said head opening is formed, a second area accommodating said disk-like recording medium, and a third area where said first shutter is located when said first shutter is opened;

an outer connection terminal formed facing said terminal insert hole for electrically connecting said disk drive apparatus and a terminal of said electronic circuit;

a second shutter separated from said first shutter and slidably provided in the case along said first side of said case for opening and closing said terminal insert hole;

a second slider formed integrally with said second shutter for guiding said second shutter to slide on said sliding direction regulator; and an energizer for energizing said first shutter in a closing direction;

wherein said second shutter is opened independently of said first shutter, is held in a position that does not cover the head opening in the opened state, and is energized in the closing direction through said first shutter as a result of said energizer energizing said first shutter in the closing direction.

2. The disk cartridge according to claim 1, wherein one end of said first slider abuts on said second slider to hold the closed state of said second shutter when said first and second shutters are closed.

3. The disk cartridge according to claim 2, further comprising:

first and second shutter opening members projecting at a predetermined interval on a line corresponding to said first side of said case along an insert direction of said case inside said disk drive apparatus for opening said first and second shutters, wherein said second shutter opening member projects more than said first shutter opening member, said case has a shutter opening groove along which said first and second shutter opening members slide along said first side, said first and second sliders abut on said first and second shutter opening members respectively in said shutter opening groove.

4. The disk cartridge according to claim 1, wherein an interval between said head opening and said terminal insert hole is equal to or greater than a width dimension in the sliding direction of said second shutter so that said second shutter is positioned between said head opening and said terminal insert hole when said terminal insert holes is opened.

5. The disk cartridge according to claim 1, wherein said case includes a tray for accommodating said disk-like recording medium and which can be attached to and detached from said case, and a tray insert hole formed on a second side facing said first side for inserting and discharging said tray in and from said case, and said tray is locked when being inserted in said tray insert hole.

* * * * *

UNITED STATES PATENT AND TRADEMARK OFFICE
CERTIFICATE OF CORRECTION

PATENT NO. : 5,537,389
DATED : July 16, 1996
INVENTOR(S) : Tadahiro Kuwa, et. al.

It is certified that error appears in the above-identified patent and that said Letters Patent is hereby corrected as shown below:

Title page, item [73], Assignee: the first listed assignee should read-- Hitachi Maxell, Ltd.--

Signed and Sealed this

Eighth Day of October, 1996

Attest:

BRUCE LEHMAN

Attesting Officer     Commissioner of Patents and Trademarks